(12) United States Patent
Kitashou

(10) Patent No.: US 8,988,311 B2
(45) Date of Patent: Mar. 24, 2015

(54) VIDEO OUTPUT APPARATUS AND VIDEO OUTPUT METHOD

(75) Inventor: Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/789,689

(22) Filed: May 28, 2010

(65) Prior Publication Data

US 2010/0302219 A1 Dec. 2, 2010

(30) Foreign Application Priority Data

Jun. 1, 2009 (JP) .................................. 2009-132354

(51) Int. Cl.
G09G 5/00 (2006.01)
G09G 5/14 (2006.01)
G06F 3/14 (2006.01)

(52) U.S. Cl.
CPC ................ G09G 5/14 (2013.01); G06F 3/1431 (2013.01); G09G 2330/021 (2013.01); G09G 2330/022 (2013.01); G09G 2340/12 (2013.01); G09G 2370/045 (2013.01)
USPC ........................................... 345/1.1; 345/1.2

(58) Field of Classification Search
CPC .................... G09G 2300/02; G09G 2300/023; G09G 2300/026
USPC .................. 345/1.1–2.2, 76–83, 87–107, 204
See application file for complete search history.

(56) References Cited

U.S. PATENT DOCUMENTS

| | | | | |
|---|---|---|---|---|
| 5,923,307 A * | 7/1999 | Hogle, IV | ........................... | 345/4 |
| 6,509,911 B1 * | 1/2003 | Shimotono | .................... | 715/761 |
| 2002/0054232 A1 * | 5/2002 | Inagaki | ......................... | 348/372 |
| 2003/0231143 A1 * | 12/2003 | Nakamura et al. | .............. | 345/1.1 |
| 2004/0222942 A1 * | 11/2004 | Hayashi et al. | ................. | 345/1.1 |
| 2006/0097955 A1 * | 5/2006 | Kato | .............................. | 345/1.1 |
| 2007/0057865 A1 * | 3/2007 | Song et al. | ..................... | 345/1.1 |
| 2007/0176847 A1 * | 8/2007 | Shah et al. | ...................... | 345/1.1 |
| 2007/0285428 A1 * | 12/2007 | Foster et al. | ................... | 345/503 |
| 2008/0068291 A1 * | 3/2008 | Yuan et al. | ...................... | 345/2.1 |
| 2008/0129648 A1 * | 6/2008 | Hagiwara et al. | .............. | 345/1.3 |
| 2009/0085871 A1 * | 4/2009 | Bhogal et al. | .................. | 345/163 |
| 2009/0146908 A1 * | 6/2009 | LeJeune et al. | ................ | 345/1.1 |
| 2011/0006690 A1 * | 1/2011 | Hoffman et al. | ............... | 315/150 |

FOREIGN PATENT DOCUMENTS

| | | |
|---|---|---|
| JP | 05-282116 A | 10/1993 |
| JP | 2000-163035 | 6/2000 |
| JP | 2001-350549 | 12/2001 |
| JP | 2006-350755 A | 12/2006 |
| JP | 2008-096571 A | 4/2008 |

* cited by examiner

*Primary Examiner* — Alexander Eisen
*Assistant Examiner* — Nelson Lam
(74) *Attorney, Agent, or Firm* — Canon USA Inc. IP Division

(57) ABSTRACT

A video output apparatus of the present invention includes an acquisition unit configured to acquire information about display states of a plurality of display devices, a video output unit configured to output video data to the display devices, and a control unit configured to, when a display device to which the video data is output by the video output unit is in a display state of OFF, control the video output unit to output the video data to a display device whose display state is ON based on the information about the display state acquired by the acquisition unit.

10 Claims, 15 Drawing Sheets

FIG.10

| WINDOW No. | WINDOW REARRANGEMENT VALIDITY FLAG | REARRANGEMENT INFORMATION | | | DEFAULT ARRANGEMENT INFORMATION | | |
|---|---|---|---|---|---|---|---|
| | | REARRANGEMENT DISPLAY DEVICE No. | WINDOW REARRANGEMENT DISPLAY COORDINATES | WINDOW REARRANGEMENT SIZE | DEFAULT DISPLAY DEVICE No. | DEFAULT WINDOW DISPLAY COORDINATES | DEFAULT WINDOW SIZE |
| 1 | 0 or 1 | (1~N) | (X, Y) | (W, H) | (1~N) | (Xd, Yd) | (Wd, Hd) |
| 2 | 0 or 1 | (1~N) | (X', Y') | (W', H') | (1~N) | (Xd', Yd') | (Wd', Hd') |
| ⋮ | | | | | | | |
| M | 0 or 1 | (1~N) | (X", Y") | (W", H") | (1~N) | (Xd", Yd") | (Wd", Hd") |

0: REARRANGEMENT INEFFECTIVE
1: REARRANGEMENT EFFECTIVE 1001, 1002, 1003, 1004

VIDEO OUTPUT APPARATUS AND VIDEO OUTPUT METHOD

BACKGROUND OF THE INVENTION

1. Field of the Invention

The present invention relates to a video output apparatus, a video output method, a program, and a storage medium. More particularly, the present invention relates to a technique useful for saving power of a multi display system.

2. Description of the Related Art

Conventionally, there is a technique used in reducing power consumption of information processing terminals. According to this technique, power of a device connected to he information processing terminal is turned off according to its usage state, so that the power consumption can be reduced. In the information processing terminal, there is provided, for example, a timer for measuring a time period that the device connected to the information processing terminal is used. When the device is not used, the timer counts up. If the device is unused for a certain period of time and a count value of the timer reaches a certain value, the power of the corresponding device is turned off, so that power consumption is reduced.

Such a power management system is widely known as a standard such as Advanced Configuration and Power Interface (ACPI) in personal computers (PC). According to devices such as a personal computer, an operating system (OS), and a hardware device conforming to such power management standard, power of devices can be managed by the OS, and power consumption can be reduced accordingly.

On the other hand, in recent years, according to development of multi-screen, high-brightness, and large-size displays, power used for operating displays is increasing. Conventionally, there is a power saving technique for a single display or a multi display unit that monitors an operation of a device such as a keyboard or a mouse. If input from such a device is not detected for a certain period of time, the power supplied to the display is turned off. Such a technique is included in a function of a general operating system.

Japanese Patent Application Laid-Open No. 2001-350549 discusses a technique for changing a power state of a multi display unit to a state that is more adapted to the actual use state. Regarding a multi display system according to the technique discussed in Japanese Patent Application Laid-Open No. 2001-350549, a user face on the display is captured as video data. Then, which display that the user directs his or her look toward is determined from the video data. According to this determination, only the power of the display which the user is looking is turned on and other displays will be turned off. As a result, the display which is actually used is turned on and the power of the multi display system can be reduced.

As another technique, Japanese Patent Application Laid-Open No. 2000-163035 discusses a technique for managing individual power source of each display included in a multi display unit. According to the multi display system discussed in Japanese Patent Application Laid-Open No. 2000-163035, a display including a resource, such as an active mouse pointer or an active window, among a plurality of displays is monitored using resource information, such as a position of the mouse pointer or an active window. Then, when the resource is not displayed on a certain display for a certain period of time, the display is changed to a low power consumption mode. Accordingly, only the power of the display on which the user is actually using the mouse pointer or the display including the active window is turned on among a plurality of displays, and power for the other displays can be saved.

As described above, according to the techniques related to power saving of a multi display, the display the user is actually using is assumed by detecting, for example, the user's line of sight, the position of the mouse pointer, or the position of the active window, and power of each display is managed individually.

However, according to the above described techniques, one or more displays among a plurality of displays will be in a non-display state. Thus, it is difficult for the user to comprehend what has been displayed and which display the user desires to use has been displayed before the power saving is performed at sight. As a result, the user needs to turn on all the displays to find out which display has the window the user desires to use. This takes unnecessary time and effort.

Further, even if the multi display system is used, a display area of the window currently used may be small depending on arrangement of the window. For example, if relatively small windows are scattered over two screens of a multi display unit, the total area of these windows may be smaller than the area of one screen. In this case, although the windows can be displayed on one screen, since they are displayed using two screens, unnecessary power is used. Generally, since the position and size of a window the user uses depend on an operation by the user, it is assumed that the unnecessary power is often used as described above.

As described above, when the power of the display unit is managed by monitoring the operation of the devices such as a keyboard or a mouse, the power of a plurality of display units is collectively managed. Thus, if there is no input from such a device for a certain period of time, all the displays will be in a non-display state, and the user will not be able to see an object on the display that the user desires to see. Further, when the total area of the windows displayed on the screen of the multi display unit is small, all the display units will be in a non-display state due to power saving reasons. Even if the user desires to arrange the windows in a smaller number of display devices, since the power of each display cannot be individually managed, the power of each display device cannot be turned off. Accordingly, power saving cannot be performed.

Further, according to the technique discussed in Japanese Patent Application Laid-Open No. 2001-350549, one or more displays among a plurality of displays to which the user's line of sight is not directed will be in a non-display state for power saving reasons. Thus, it is difficult for the user to know the window that has been displayed before the power saving. Further, when a window that the user newly opens is arranged on a screen of a display in the non-display state, the user cannot quickly determine a display on which the new window is displayed. Thus, the user needs to direct his eye on all the displays so that they are changed into the display state.

Further, even if the total area of the windows displayed on the screen of the multi display unit is small, the user needs to direct his line of sight to all the display devices to turn them on. Thus, power is not saved as intended.

Similarly, the technique discussed in the Japanese Patent Application Laid-Open No. 2000-163035 is not usable in determining which window has been displayed before the power saving is performed. Further, even if the total area of the windows displayed on the screen of the multi display unit is small, the user needs to display all the screens by using, for example, a mouse pointer to turn them on. Thus, power is not saved as intended.

SUMMARY OF THE INVENTION

The present invention is directed to a method for adequately saving power of a display device and quickly determining a window that a user desires to use.

According to an aspect of the present invention, a video output apparatus includes an acquisition unit configured to acquire information about display states of a plurality of display devices, a video output unit configured to output video data to the display devices, a control unit configured to, when a display device to which the video data is output by the video output unit is in a display state of OFF, control the video output unit to output the video data to a display device whose display state is ON based on the information about the display state acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of a data structure of window arrangement information.

DESCRIPTION OF THE EMBODIMENTS

Various exemplary embodiments, features, and aspects of the invention will be described in detail below with reference to the drawings.

According to an exemplary embodiment, a configuration of a video output apparatus and processing flow will be described with reference to FIG. 5. Then, detailed processing of each unit will be described with reference to FIGS. 6 to 15. After then, each of functions realized by the present exemplary embodiment will be described with reference to FIGS. 1 to 4.

Figure 5:
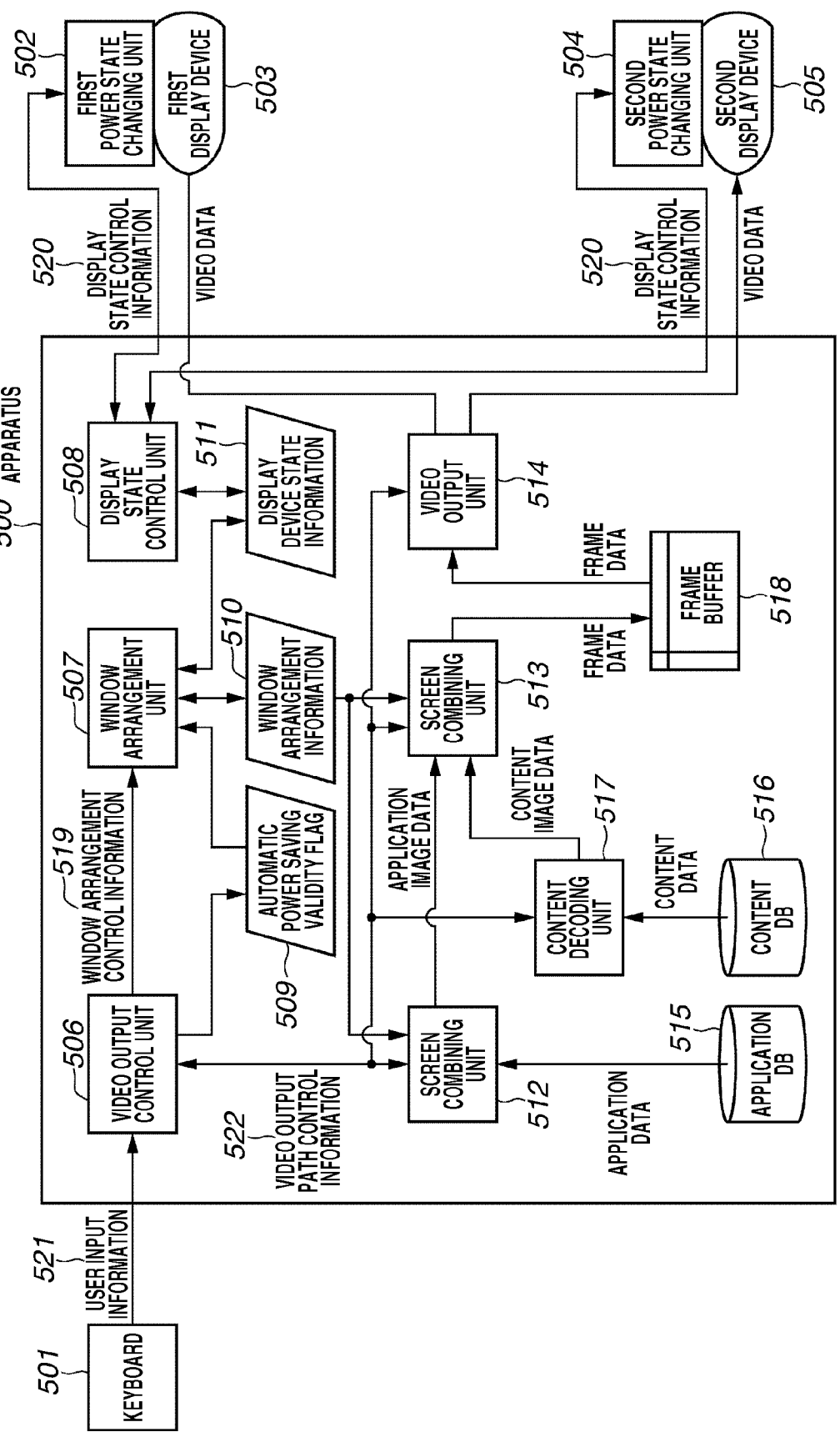
FIG. 5 is a block diagram illustrating a configuration example of a video output apparatus according to an exemplary embodiment of the present invention.

FIG. 5 is a block diagram illustrating an example of a configuration of a main portion of a video output apparatus 500 according to the present exemplary embodiment. The video output apparatus 500 according to the present exemplary embodiment can save power of a first display device 503 and a second display device 505 by controlling generation of video data and display states of the first display device 503 and the second display device 505. The flow of the processing will be described in detail below.

According to a user operating a keyboard 501, the keyboard 501 obtains user input information 521 and transmits the information to the video output apparatus 500. The user input information 521 is information of an arbitrary key that has been input. The user input information 521 is used for instructing the video output apparatus 500 to start or end an application unit 512 or a content decoding unit 517 of the video output apparatus 500, or for instructing the video output apparatus 500 to enter into an automatic power saving mode.

A video output control unit 506 receives the user input information 521 and changes an automatic power saving validity flag 509 from valid to invalid or vice versa. The automatic power saving validity flag 509 is used for changing a power saving control mode of the video output apparatus 500 from ON to OFF and vice versa.

Further, the video output control unit 506 transmits video output path control information 522 to each of the application unit 512, the content decoding unit 517, a screen combining unit 513, and a video output unit 514 so that a screen transition requested in the user input information 521 is performed. In other words, the start/end of the application unit 512 or the content decoding unit 517 is controlled according to the user input information.

Figure 11:
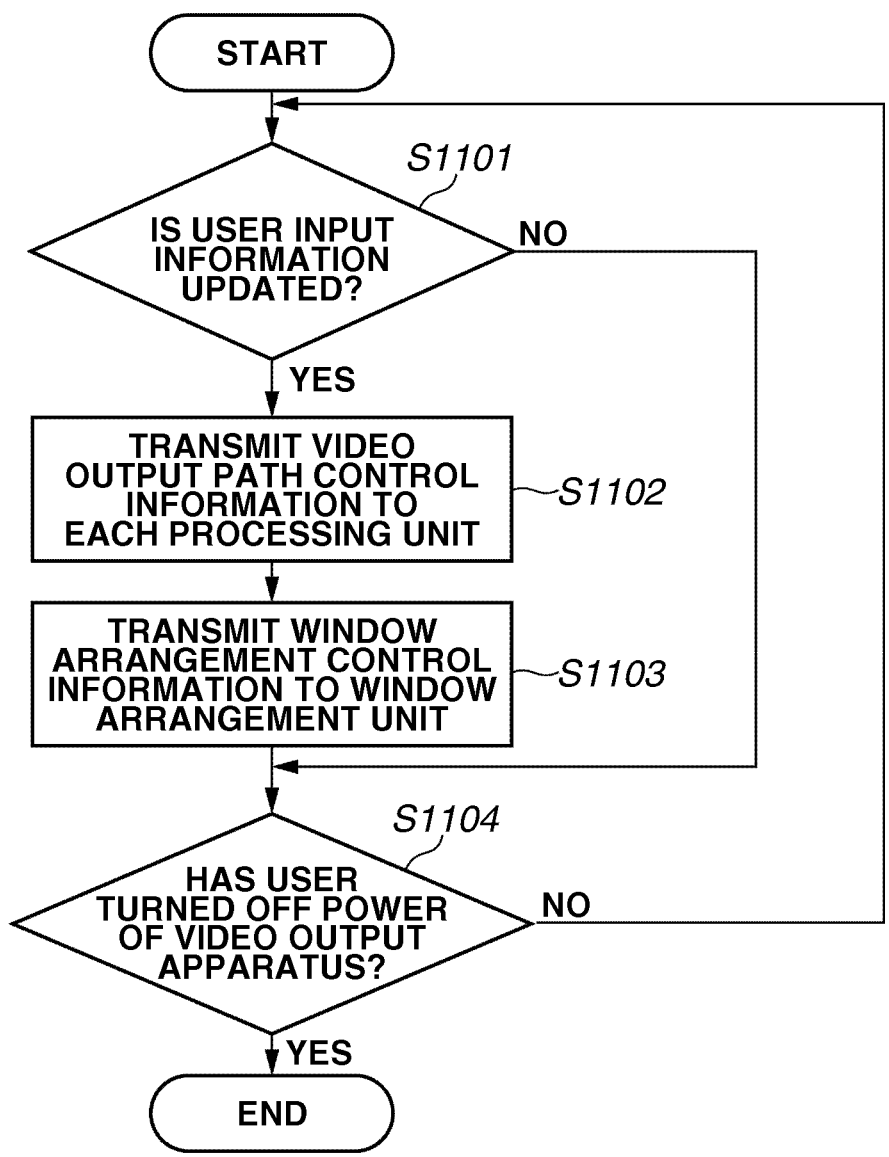
FIG. 11 is a flowchart illustrating an example of processing procedures performed by the video output control unit.

FIG. 11 is a flowchart illustrating an example of processing procedures performed by the video output control unit 506 according to the present exemplary embodiment.

In step S1101, the video output control unit 506 receives the user input information 521 and determines whether the user input information 521 is updated. If the user input information 521 is not updated (NO in step S1101), the processing proceeds to step S1104. If the user input information 521 is updated (YES in step S1101), the process proceeds to step S1102. In step S1102, the video output control unit 506 transmits the video output path control information 522 to each of the above described units.

If a request for the start of the application unit 512 is included in the user input information 521, the video output control unit 506 transmits information about an application database (DB) 515 to be referred and a start request to the application unit 512 as the video output path control information 522. If a request for the end of the application unit 512 is included in the user input information 521, information about an end request is transmitted to the application unit 512. A start/end request is transmitted to the content decoding unit 517 in a manner similar to that of the application unit 512.

The video output control unit 506 controls combining processing of display screens by transmitting the video output path control information 522 to the screen combining unit 513. Further, the video output control unit 506 performs video output control by transmitting the video output path control information 522 to the video output unit 514. As described above, an application window or a content video window requested by the user is displayed by control of the application unit 512, the content decoding unit 517, the screen combining unit 513, and the video output unit 514.

In step S1103, the video output control unit 506 transmits window arrangement control information 519 to a window arrangement unit 507 described below. Details of functions of the window arrangement unit 507 and the window arrangement control information 519 will be described in detail below. In step S1104, the video output control unit 506 determines whether the user has turned off the power to a main body of the video output apparatus 500. If the video output control unit 506 determines that the user has turned off the power (YES in step S1104), then the processing ends. If the video output control unit 506 determines that the user has not turned off the power (NO in step S1104), the processing returns to step S1101.

Figure 12:
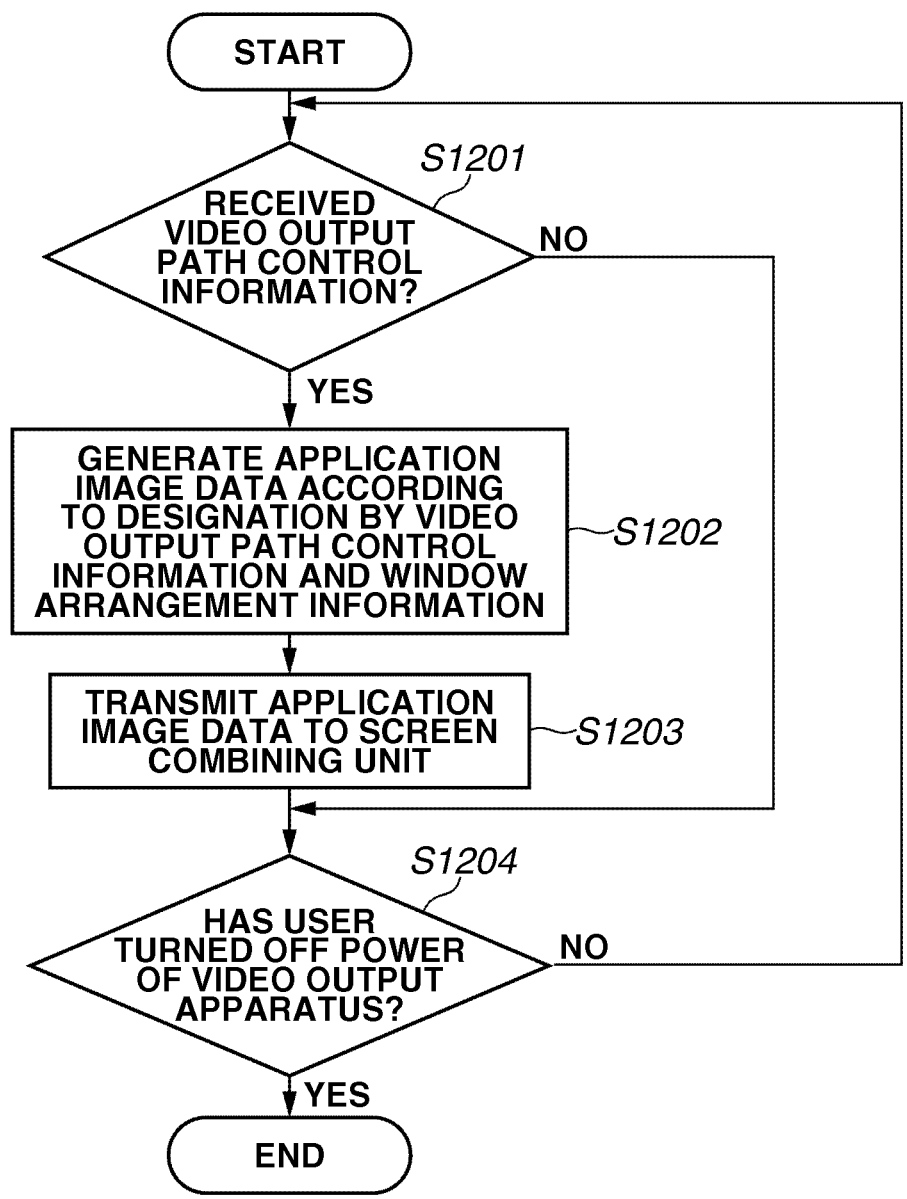
FIG. 12 is a flowchart illustrating an example of processing procedures performed by an application unit.

FIG. 12 is a flowchart illustrating an example of processing procedures performed by the application unit 512 according to the present exemplary embodiment.

In step S1201, the application unit 512 determines whether the video output path control information 522 is received from the video output control unit 506. If the video output path control information 522 determines that the video output path control information 522 is not received (NO in step S1201), the processing proceeds to step S1204. On the other hand, if the video output path control information 522 determines that the video output path control information 522 is received (YES in step S1201), the processing proceeds to step S1202.

In step S1202, the application unit 512 references the application DB 515 designated by the video output path control information 522 and generates application image data according to a layout designated by window arrangement information 510. The window arrangement information 510 includes information about a size and arrangement coordinates of a window. For example, if the application unit 512 uses spreadsheets, the application unit 512 references an arbitrary numerical file as the application DB 515. Next, the application unit 512 generates window image data in which a graph or a grid is drawn in a size designated by the window arrangement information 510.

In step S1203, the application unit 512 transmits the application image data generated in step S1202 to the screen combining unit 513. In step S1204, the application unit 512 determines whether the user has turned off the power to the main body of the video output apparatus 500. If the application unit 512 determines that the user has turned off the power (YES in step S1204), then the processing ends. If the application unit 512 determines that the user has not turned off the power (NO in step S1204), then the processing returns to step S1201.

Figure 13:
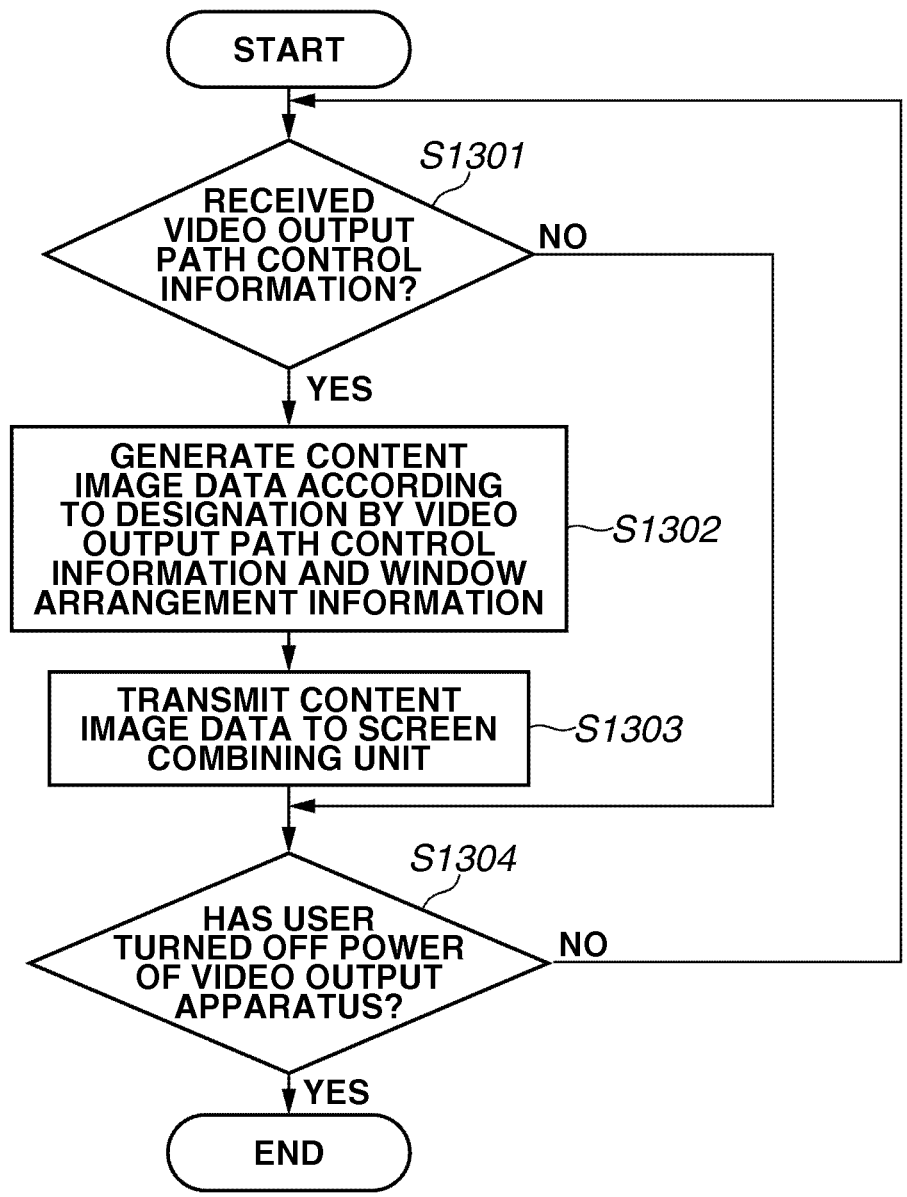
FIG. 13 is a flowchart illustrating an example of processing procedures performed by a content coding unit.

FIG. 13 is a flowchart illustrating an example of processing procedures performed by the content decoding unit 517 according to the present exemplary embodiment.

In step S1301, the content decoding unit 517 determines whether the video output path control information 522 is received from the video output control unit 506. If the content decoding unit 517 determines that the video output path control information 522 is not received (NO in step S1301), the processing proceeds to step S1304. If the content decoding unit 517 determines that the video output path control information 522 is received (YES in step S1301), then the processing proceeds to step S1302.

In step S1302, the content decoding unit 517 references a content DB 516 designated by the video output path control information 522 similar to that the application unit 512 references the application DB 515. Then, the content decoding unit 517 generates content image data according to a layout designated by the window arrangement information 510. For example, if the content decoding unit 517 is a Moving Picture Experts Group 2 (MPEG2) decoder, the content decoding unit 517 references an arbitrary MPEG2 file as the content DB 516. Then, the content decoding unit 517 generates frame image data from the MPEG2 file according to a size designated by the window arrangement information 510.

In step S1303, the content decoding unit 517 transmits the content image data generated in step S1302 to the screen combining unit 513. In step S1304, the content decoding unit 517 determines whether the user has turned off the power to the main body of the video output apparatus 500. If the content decoding unit 517 determines that the user has turned off the power (YES in step S1304), then the processing ends. If the content decoding unit 517 determines that the user has not turned off the power (NO in step S1304), then the processing returns to step S1301.

Figure 14:
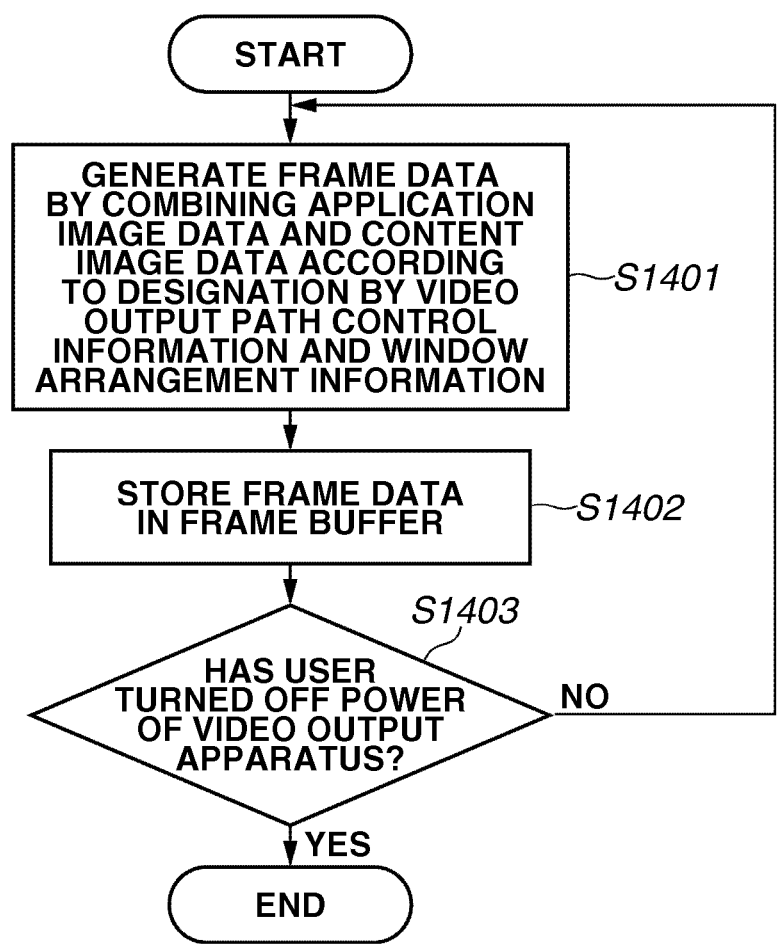
FIG. 14 is a flowchart illustrating an example of processing procedures performed by a screen combining unit.

FIG. 14 is a flowchart illustrating an example of processing procedures performed by the screen combining unit 513 according to the present exemplary embodiment.

In step S1401, the screen combining unit 513 references the video output path control information 522 and the window arrangement information 510. Then, the screen combining unit 513 generates frame data from the application image data and the content image data that have been input. In other words, a combined image of the application image data and the content image data is generated by the screen combining unit 513 on the coordinates designated by the window arrangement information 510 and generates frame data for each of a plurality of display devices.

In step S1402, the frame data generated in step S1401 is stored in a frame buffer 518. The frame buffer 518 is buffer memory used for temporarily storing the frame data. The frame buffer 518 acquires the frame data from the screen combining unit 513, temporarily stores it, and transmits it to the video output unit 514.

In step S1403, the screen combining unit 513 determines whether the user has turned off the power to the main body of the video output apparatus 500. If the screen combining unit 513 determines that the user has turned off the power (YES in step S1403), then the processing ends. If the screen combining unit 513 determines that the user has not turned off the power (NO in step S1403), the processing returns to step S1401.

Figure 15:
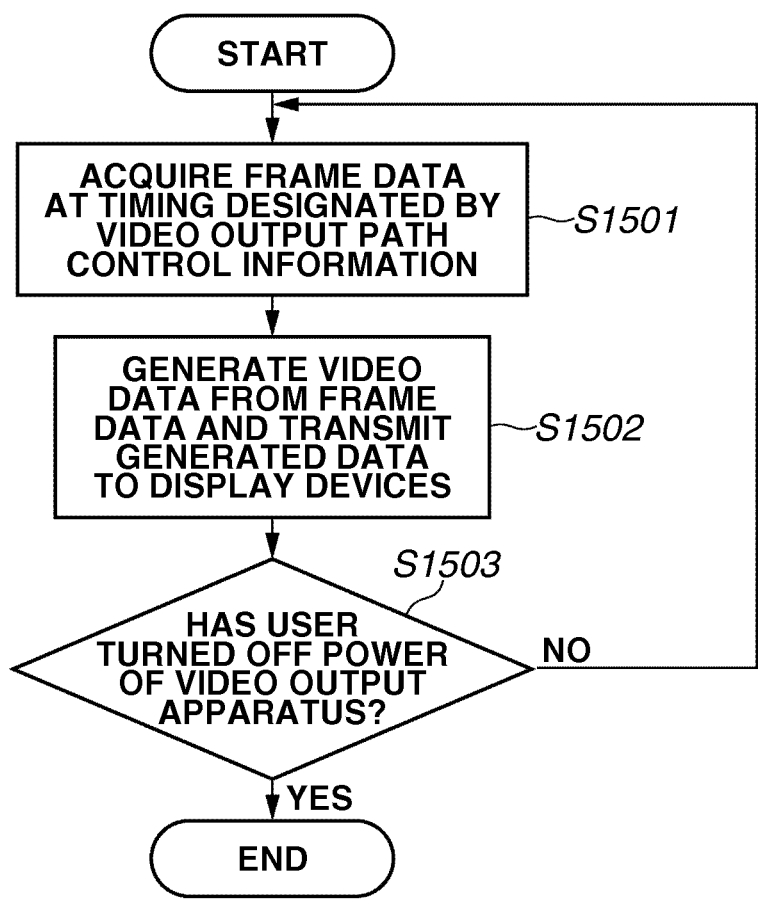
FIG. 15 is a flowchart illustrating an example of processing procedures performed by a video output unit.

FIG. 15 is a flowchart illustrating an example of processing procedures performed by the video output unit 514 according to the present exemplary embodiment.

In step S1501, the video output unit 514 acquires the frame data from the frame buffer 518 at timing designated by the video output path control information 522. In step S1502, the video output unit 514 generates video data from the frame data acquired in step S1501 and transmits the generated video data to a plurality of display devices. The video data is obtained by converting the frame data into a video signal of an arbitrary standard.

In step S1503, the video output unit 514 determines whether the user has turned off the power to the main body of the video output apparatus 500. If the video output unit 514 determines that the user has turned off the power (YES in step S1503), then the processing ends. If the video output unit 514 determines that the user has not turned off the power (NO in step S1503), the processing returns to step S1501.

As described above, the video data to be displayed on the plurality of display devices is generated by the video output control unit 506, the window arrangement information 510, the application unit 512, the screen combining unit 513, and the video output unit 514. The screen combining unit 513 and the video output unit 514 function as video output units.

Next, management control of the plurality of display devices in a power saving state will be described. The management of the power saving state is performed by the window arrangement unit 507, a display state control unit 508, the automatic power saving validity flag 509, the window arrangement information 510, display device state information 511, a first power state changing unit 502, and a second power state changing unit 504.

The automatic power saving validity flag 509 is used for designating a power saving management mode of the video output apparatus 500. When the automatic power saving validity flag 509 is valid, the video output apparatus 500 manages the power saving state of the first display device 503 and the second display device 505. On the other hand, when the automatic power saving validity flag 509 is invalid, the video output apparatus 500 does not manage the power saving state of the first display device 503 and the second display device 505.

FIG. 10 illustrates an example of a data structure of the window arrangement information 510. The window arrangement information 510 is used for designating arrangement of windows displayed on the plurality of display devices. As illustrated in FIG. 10, the window arrangement information 510 is a list of data fields including a window number (No.) (1001), a window rearrangement validity flag 1002, rearrangement information 1003, and default arrangement information 1004. A number of each of the data fields corresponds to the number of the windows. The video output apparatus 500 of the present exemplary embodiment arranges each window according to the window arrangement information 510.

Regarding the data fields, the default arrangement information 1004 includes "default display device No." which indicates the display device that displays the window, "default window display coordinates" which indicates arrangement coordinates of the displayed window, and "default window size" which is the size of the displayed window. The data fields of the rearrangement information 1003 are similar to those of the default arrangement information 1004.

The window rearrangement validity flag 1002 indicates whether the default arrangement information 1004 or the rearrangement information 1003 is valid. According to the present exemplary embodiment, if the window rearrangement validity flag 1002 is "0", the default arrangement information 1004 is valid. If the window rearrangement validity flag 1002 is "1", the rearrangement information 1003 is valid. The window No. (1001) is identification (ID) used for identifying a window displayed on the plurality of display devices. According to these pieces of the information described above, the arrangement of the place and position of each window on the screens of the display devices can be designated.

Figure 8:
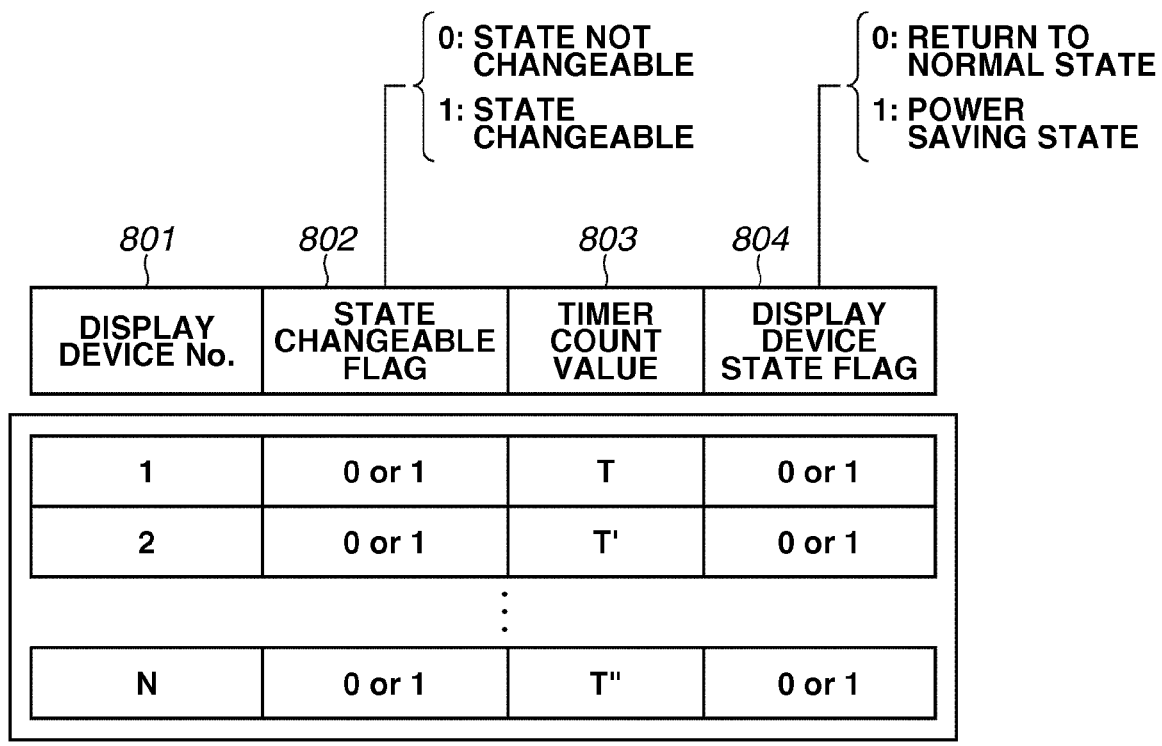
FIG. 8 illustrates an example of a data structure of display device state information.

FIG. 8 illustrates an example of a data structure of the display device state information 511. The display device state information 511 is used for designating states of the plurality of display devices connected to the video output apparatus 500.

As illustrated in FIG. 8, the display device state information 511 is a list of data fields including a display device No. (801), a state changeable flag 802, a timer count value 803, and a display device state flag 804. A number of each of the data fields corresponds to the number of the display devices. The video output apparatus 500 according to the present exemplary embodiment manages display states of the plurality of display devices according to the display device state information 511.

As for each data field, the display device No. (801) is an ID used for identifying the plurality of display devices connected to the video output apparatus 500. The state changeable flag 802 indicates whether the state of each display device can be changed externally. The timer count value 803 is used for determining whether information of each display device included in the display device state information 511 is not updated for a certain period of time. The timer count value 803 indicates a time that elapsed after the last update of the display state. The display device state flag 804 is used for storing power saving state information of each display device. According to these pieces of the information, the power saving state of each display device is managed.

The window arrangement unit 507 functions as a control unit and controls the window arrangement and the power saving state of each display device. The automatic power saving validity flag 509, the window arrangement control information 519, the window arrangement information 510, and the display device state information 511 described above are input to the window arrangement unit 507, and the window arrangement information 510 and the display device state information 511 are updated by the window arrangement unit 507. Whether to add or delete a window is determined according to the window arrangement control information 519.

Figure 9:
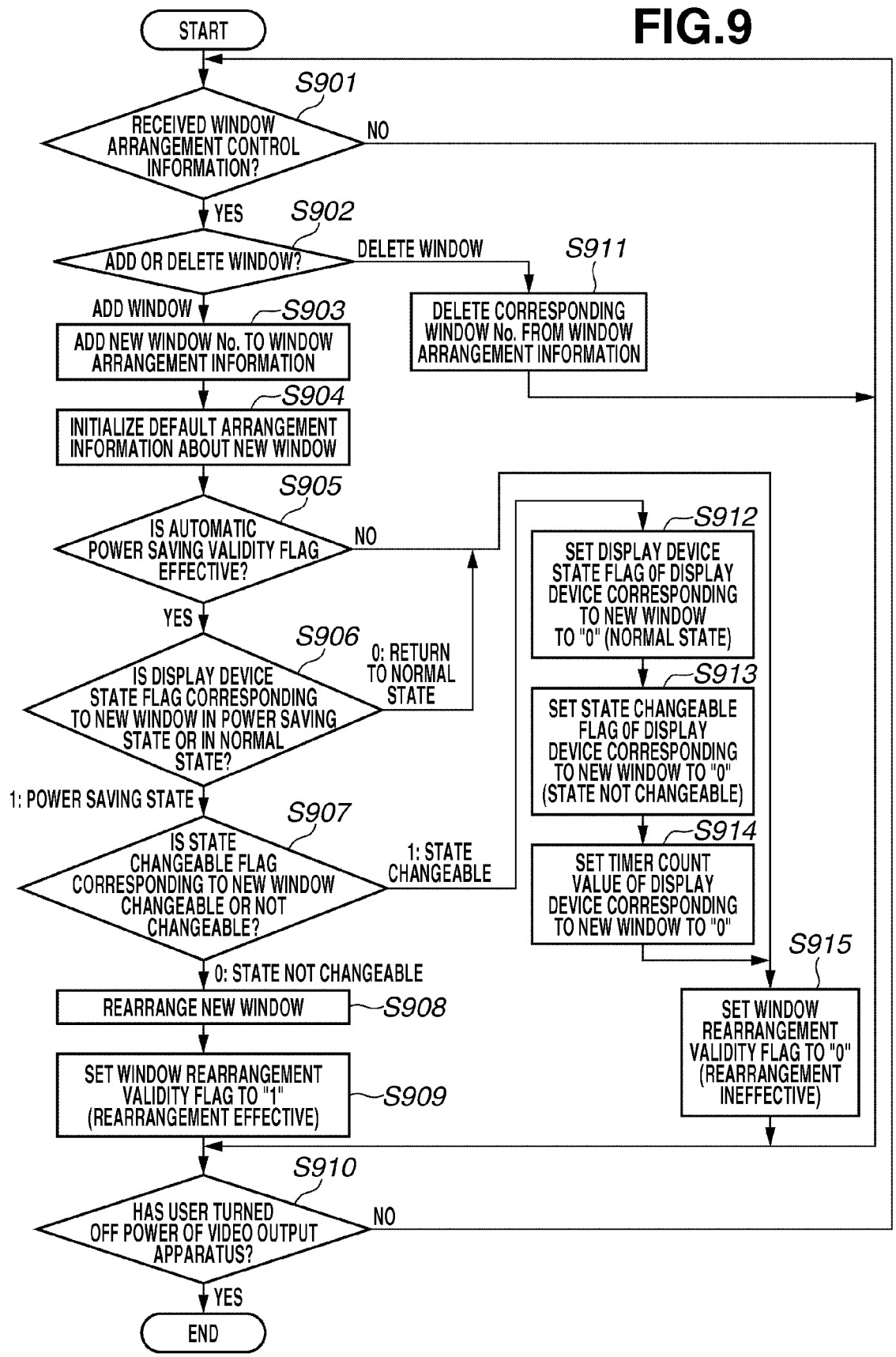
FIG. 9 is a flowchart illustrating an example of processing procedures performed by a window arrangement unit.

FIG. 9 is a flowchart illustrating an example of processing procedures performed by the window arrangement unit 507 according to the present exemplary embodiment.

In step S901, the window arrangement unit 507 determines whether it has received the window arrangement control information 519 transmitted from the video output control unit 506. If the window arrangement unit 507 determines that the window arrangement control information 519 is not received (NO in step S901), the processing proceeds to step S910. If the window arrangement unit 507 determines that the window arrangement control information 519 is received (YES in step S901), the processing proceeds to step S902.

In step S902, the window arrangement unit 507 determines whether a request for adding or deleting a window is included in the window arrangement control information 519. If deletion of a window is requested in the window arrangement control information 519 (DELETE WINDOW in step S902), the processing proceeds to step S911. In step S911, the window arrangement unit 507 deletes the window No. (1001) corresponding to the request from the window arrangement information 510. Then, the processing proceeds to step S910.

On the other hand, if a request for adding a window is included in the window arrangement control information 519 (ADD WINDOW in step S902), the processing proceeds to step S903. In step S903, the window arrangement unit 507 adds a new ID (a new window No.) to the window No. (1001) in the window arrangement information 510. In step S904, each field of the default arrangement information 1004 is initialized and assigned a default value. The default value is a predefined arbitrary value. Thus, the power saving of the display device is not considered at this point.

In step S905, the window arrangement unit 507 determines whether the automatic power saving validity flag 509 is valid. If the automatic power saving validity flag 509 is invalid (NO in step S905), then the processing proceeds to step S915. In step S915, the window arrangement unit 507 sets the window rearrangement validity flag 1002 to "0" (rearrangement invalid).

On the other hand, in step S905, if the automatic power saving validity flag 509 is valid (YES in step S905), the processing proceeds to step S906. In step S906, the window arrangement unit 507 sets default values, taking the window arrangement and the display device state at that time into consideration, in the window arrangement information 510 and the display device state information 511 of the new window. More specifically, in step S906, the window arrangement unit 507 references the display device state information 511 and determines whether the display device state flag 804 of the display device that displays the new window is in the power saving state or in a normal state which is returned from the power saving state. If the display device state flag 804 is "0" (normal state), since the new window can be displayed as it is, the processing proceeds to step S915.

On the other hand, in step S906, if the display device state flag 804 is "1" (power saving state), the processing proceeds to step S907. In step S907, the window arrangement unit 507 references the display device state information 511 and determines the state of the state changeable flag 802 of the display device that displays the new window. If the state changeable flag 802 is "0" (state not changeable), the processing proceeds to step S908. In step S908, the new window is rearranged.

The rearrangement of the new window is to assign rearrangement information of the window No. corresponding to the new window in the window arrangement information 510 to a display area of a display device in the normal state. In other words, a default value that contributes to reducing the power consumption of each display device is set in each field of the rearrangement information 1003 of the new window. For example, the new window is not assigned to the display device in the power saving state, but assigned only to the display device in the normal state. Then, the window rearrangement display coordinates are moved and the window rearrangement size is resized. In step S909, the window rearrangement validity flag 1002 is set to "1" (rearrangement valid).

In step S910, the window arrangement unit 507 determines whether the user has turned off the power to the main body of the video output apparatus 500. If the window arrangement unit 507 determines that the user has turned off the power (YES in step S910), then the processing ends. If the window arrangement unit 507 determines that the user has not turned off the power (NO in step S910), the processing returns to step S901.

On the other hand, in step S907, if the state changeable flag 802 is "1" (state changeable), the processing proceeds to step S912. In step S912, the window arrangement unit 507 sets the display device state flag 804 included in the display device that displays the new window to "0" (normal state). In step S913, the window arrangement unit 507 sets the state changeable flag 802 of the display device that displays the new window to "0" (state not changeable).

In step S914, the timer count value 803 of the display device that displays the new window is set to "0", and the processing proceeds to step S915.

The display state control unit 508 monitors and controls the display states of the plurality of display devices connected to the video output apparatus 500. The display device state information 511 and display state control information 520 is input to the display state control unit 508. Then, the display device state information 511 and the display state control information 520 are updated by the display state control unit 508. In other words, if the display state of each display device is updated by the first power supply switch unit 502 or the second power supply switch unit 504, the updated value is stored into the state of the display device state flag 804 in the display device state information 511.

Figure 7:
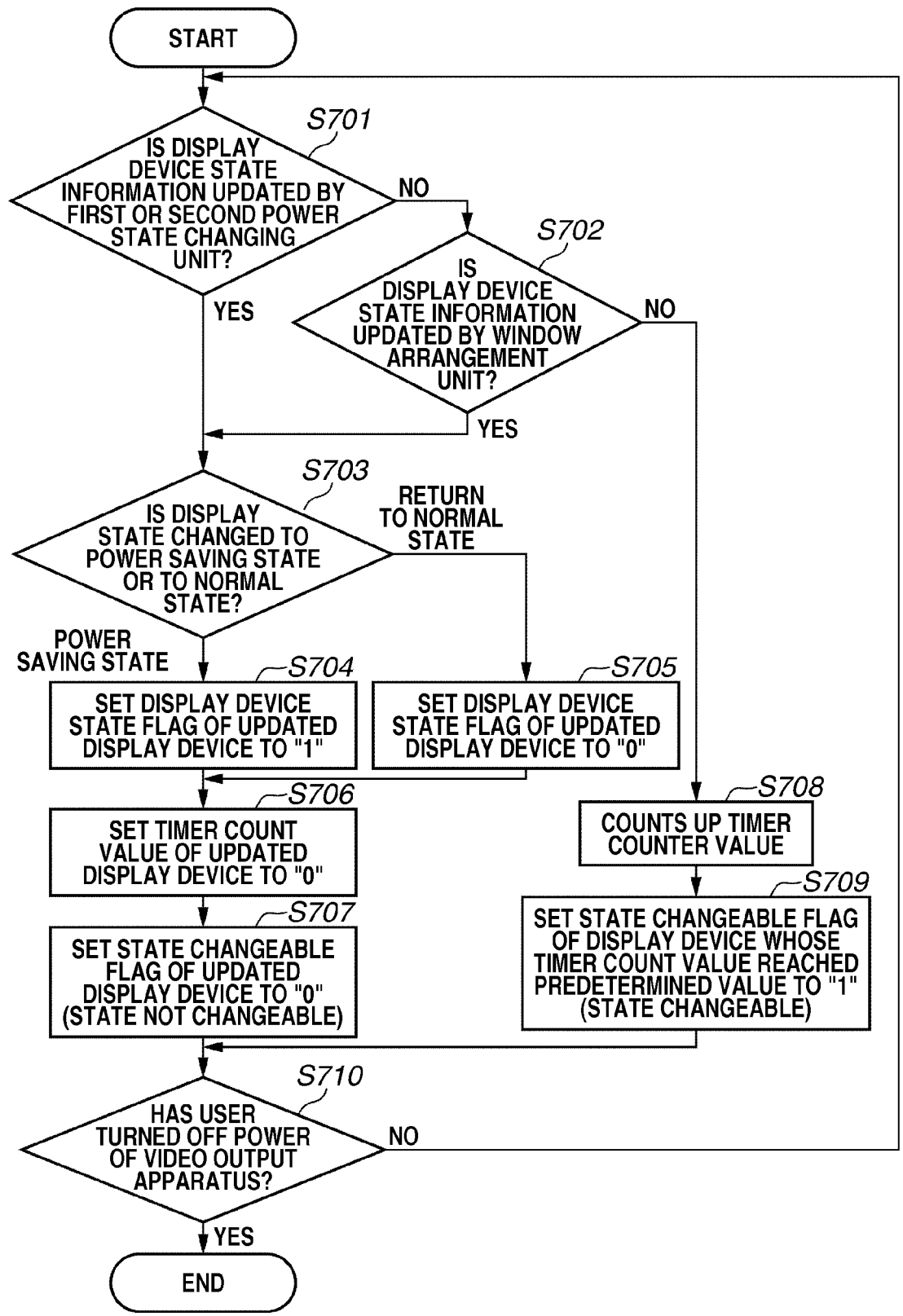
FIG. 7 is a flowchart illustrating an example of processing procedures performed by a display state control unit.

FIG. 7 is a flowchart illustrating an example of processing procedures performed by the display state control unit 508 according to the present exemplary embodiment.

In step S701, the display state control unit 508 determines whether the display state control information 520 is updated by the first power state changing unit 502 or the second power state changing unit 504. Details of the first power state changing unit 502 and the second power state changing unit 504 will be described below. If the display state control information 520 is updated (YES in step S701), then the processing proceeds to step S703.

On the other hand, if the display state control information 520 is not updated (NO in step S701), the processing proceeds to step S702. In step S702, the display state control unit 508 determines whether the display device state information 511 is updated by the window arrangement unit 507. If the display device state information 511 is updated (YES in step S702), then the processing proceeds to step S703. In step S703, the display state control unit 508 determines whether the state of the updated display device is changed to the power saving state or returned to the normal state.

In step S703, if the display device is changed into the power saving state, the processing proceeds to step S704. In step S704, the display state control unit 508 sets the display device state flag 804 included in the display device state information 511 of the updated display device to "1" (power saving state). On the other hand, in step S703, if the display device is returned to the normal state, the processing proceeds to step S705. In step S705, the display device state flag 804 included in the display device state information 511 of the updated display device is set to "0" (normal state).

In step S706, the timer count value 803 included in the display device state information 511 of the updated display device is set to "0". In step S707, the state changeable flag 802 included in the display device state information 511 of the updated display device is set to "0" (state not changeable).

On the other hand, in step S702, if the display device state information 511 is not updated (NO in step S702), then the processing proceeds to step S708. In step S708, the display state control unit 508 counts up the timer count value 803 included in the display device state information 511. In step S709, the state changeable flag 802 of the display device whose timer count value 803 has reached a predetermined value is set to "1" (state changeable).

In step S710, the display state control unit 508 determines whether the user has turned off the power to the main body of the video output apparatus 500. If the display state control unit 508 determines that the user has turned off the power (YES in step S710), then the processing ends. If the display state control unit 508 determines that the user has not turned off the power (NO in step S710), the processing returns to step S701.

As described above, the display state control unit 508 totally monitors the update of the display state performed by the first power state changing unit 502, the second power state changing unit 504, and the window arrangement unit 507. Then, if the display state is not changed for a certain period of time, the state changeable flag of the display device state information 511 is set to "1" (state changeable). In this way, power saving of a display device whose display state has not been updated for a certain period of time is individually performed.

The first power state changing unit 502 controls the display state of the first display device 503. In other words, when control to changing the state of the first display device 503 to the power saving state or the normal state is performed by the video output apparatus 500 or by the operation of the user, then the state of the first display device 503 is changed to the power saving state or the normal state. The operation by the user may include, for example, the control by turning a switch provided on the first display device 503. The operation of the second power state changing unit 504 is similar to that performed by the first power state changing unit 502.

Figure 6:
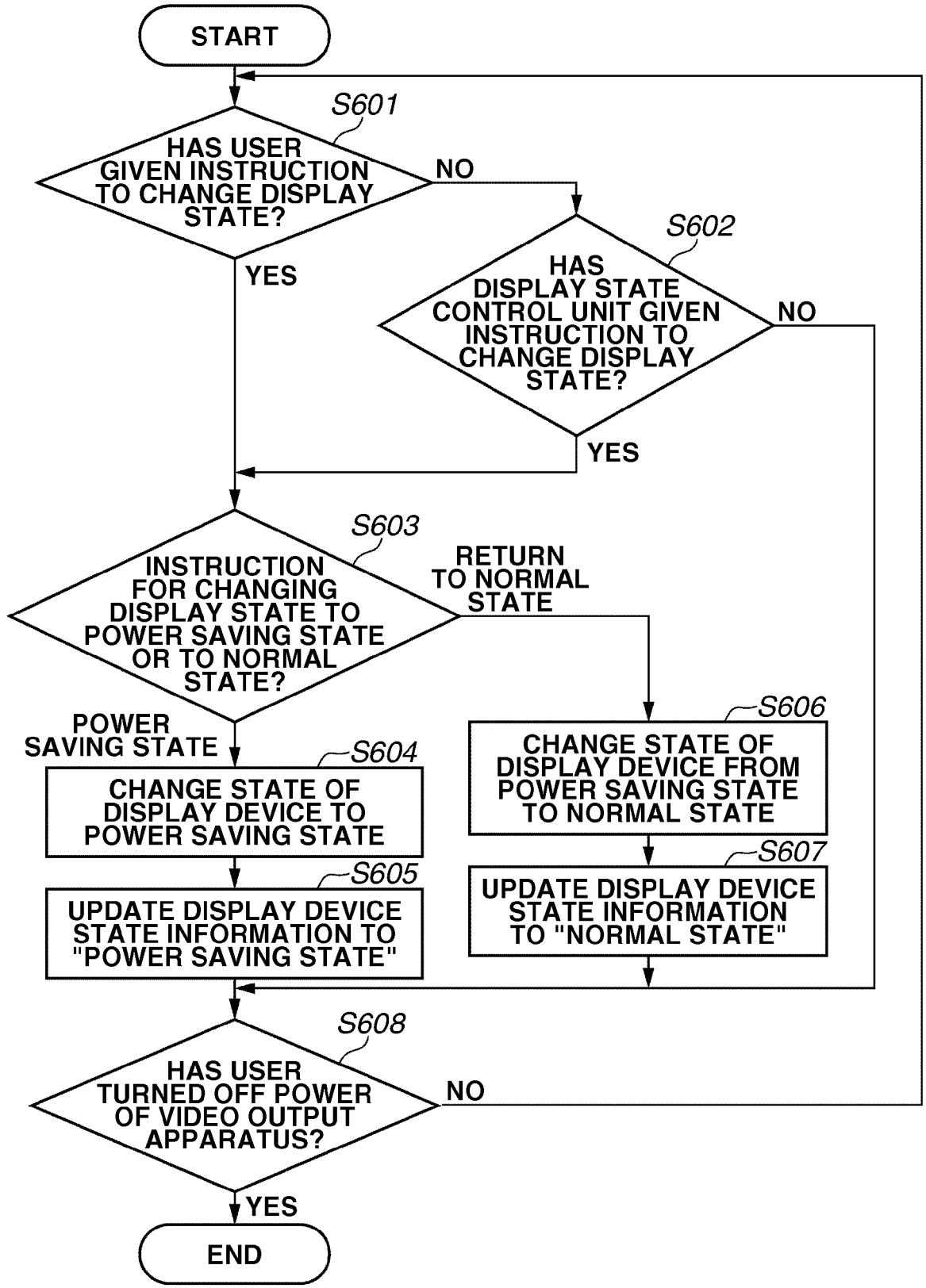
FIG. 6 is a flowchart illustrating an example of processing procedures performed by a power state changing unit.

FIG. 6 is a flowchart illustrating an example of processing procedures performed by the first power state changing unit 502 according to the present exemplary embodiment. Since the processing procedures performed by the second power state changing unit 504 is similar to those of the first power state changing unit 502, only the procedures of the first power state changing unit 502 will be described.

In step S601, the first power state changing unit 502 determines whether the user has given an instruction to change the display state to the power saving state or the normal state by operating, for example, a switch of the first display device 503. If the instruction to change the state to the power saving state or the normal state is given (YES in step S601), the processing proceeds to step S603.

On the other hand, in step S601, if the instruction to change the state to the power saving state or the normal state is not given (NO in step S601), then the processing proceeds to step S602. In step S602, the first power state changing unit 502 determines whether it has received an instruction to change the state to the power saving state or the normal state included in the display state control information 520 transmitted by the display state control unit 508. If the instruction to change the state to the power saving state or the normal state is not received (NO in step S602), then the processing proceeds to step S608.

On the other hand, if the instruction to change the state to the power saving state or the normal state is received (YES in step S602), then the processing proceeds to step S603. In step S603, the first power state changing unit 502 determines whether the received instruction is to change the state into the power saving state or into the normal state.

In step S603, if the instruction is to change the state into the power saving state, then the processing proceeds to step S604. In step S604, the state of the first display device 503 is changed to the power saving state. The power saving state of the first display device 503 is achieved, for example, by turning off the back light. When the first display device 503 is in the power saving state, the back light of the first display device 503 is turned off so that power consumption is reduced. In step S605, the display state control information 520 is updated and the first power state changing unit 502 instructs the display state control unit 508 to update the display device state information 511 to the "power saving state".

On the other hand, in step S603, if the instruction is to return the state into the normal state, then the processing proceeds to step S606. In step S606, the first power state changing unit 502 changes the first display device 503 from the power saving state to the normal state. The first display device 503 is returned to the normal state when the back light is turned on. When the first display device 503 is returned to the normal state, a video image based on the input video data is displayed on the screen of the first display device 503, and the user can view the image. In step S607, the display state control information 520 is updated and the first power state changing unit 502 instructs the display state control unit 508 to update the display device state information 511 to the "normal state".

In step S608, the first power state changing unit 502 determines whether the user has turned off the power to the main body of the video output apparatus 500. If the first power state changing unit 502 determines that the user has turned off the power (YES in step S608), then the processing ends. If the first power state changing unit 502 determines that the user has not turned off the power (NO in step S608), then the processing returns to step S601.

Next, examples of the display screen according to the present exemplary embodiment will be described referring to FIGS. 1 to 4.

Figure 1:
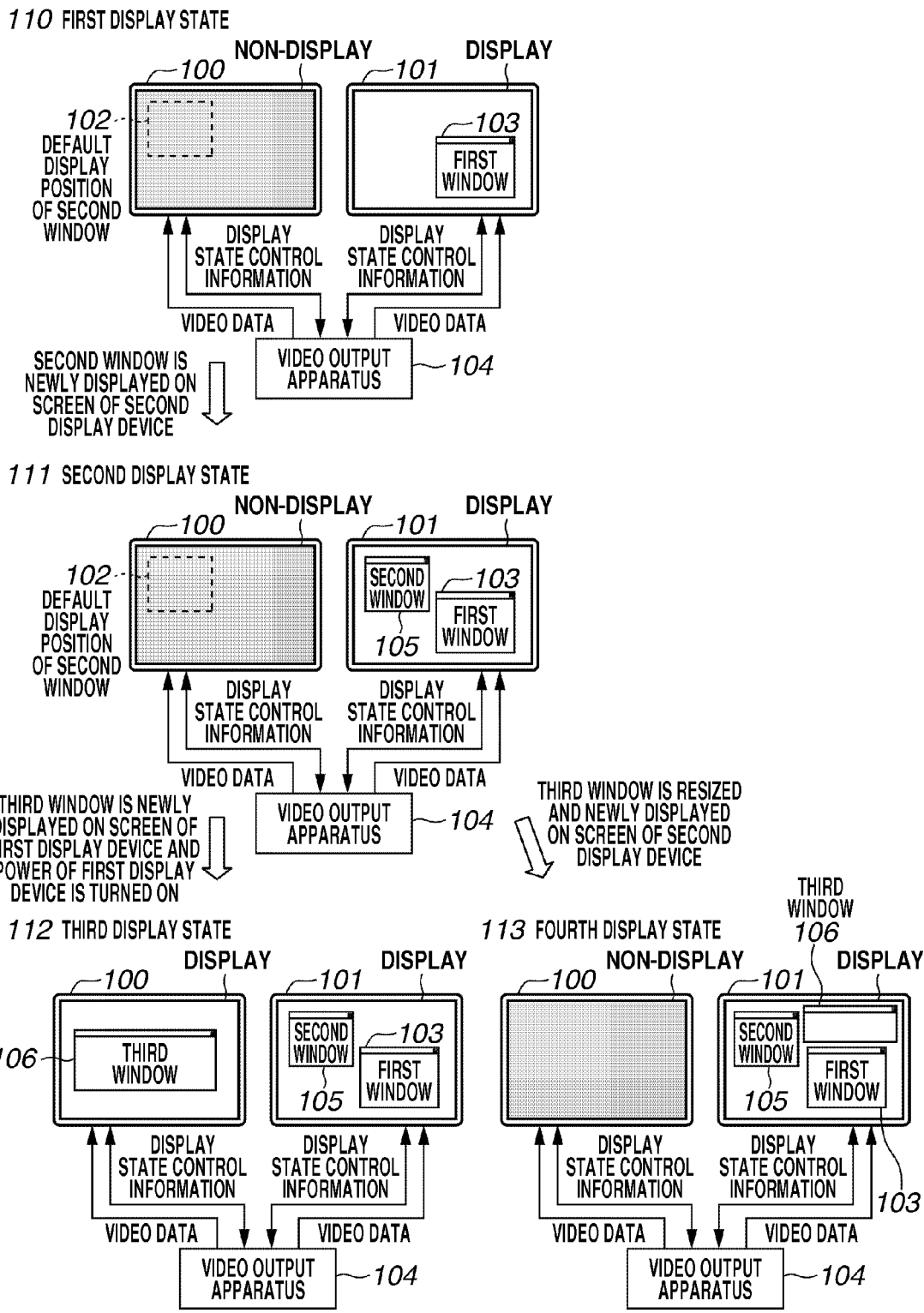
FIG. 1 illustrates an example of a screen transition of a multi display.

FIG. 1 illustrates an example of a screen transition of a multi display of a first use case according to the present exemplary embodiment. In a first display state 110 in FIG. 1, a first display device 100 is in the power saving state and a second display device 101 is in the normal state. A first window 103 is displayed on the screen of the second display device 101. In a second display state 111, if a second window 105 is newly displayed according to a user's operation, the second window 105 will be rearranged on the screen of the second display device 101 instead of being displayed at a default display position 102 on the screen of the first display device 100 in the power saving state.

In a third display state 112 and a fourth display state 113, a third window 106 is newly added. In the third display state 112, the first display device 100 is returned to the normal state and the third window 106 is displayed on the screen of the first display device 100.

In the fourth display state 113, the third window 106 is rearranged on the screen of the second display device 101 with its size reduced (resized). As can be seen from FIG. 1, the windows in the second display state 111 and the fourth display state 113 are rearranged so that the windows are displayed on one screen instead of being displayed on two screens of the display devices in the normal state. In this manner, the user can view all the windows while reducing the power consumption.

Figure 2:
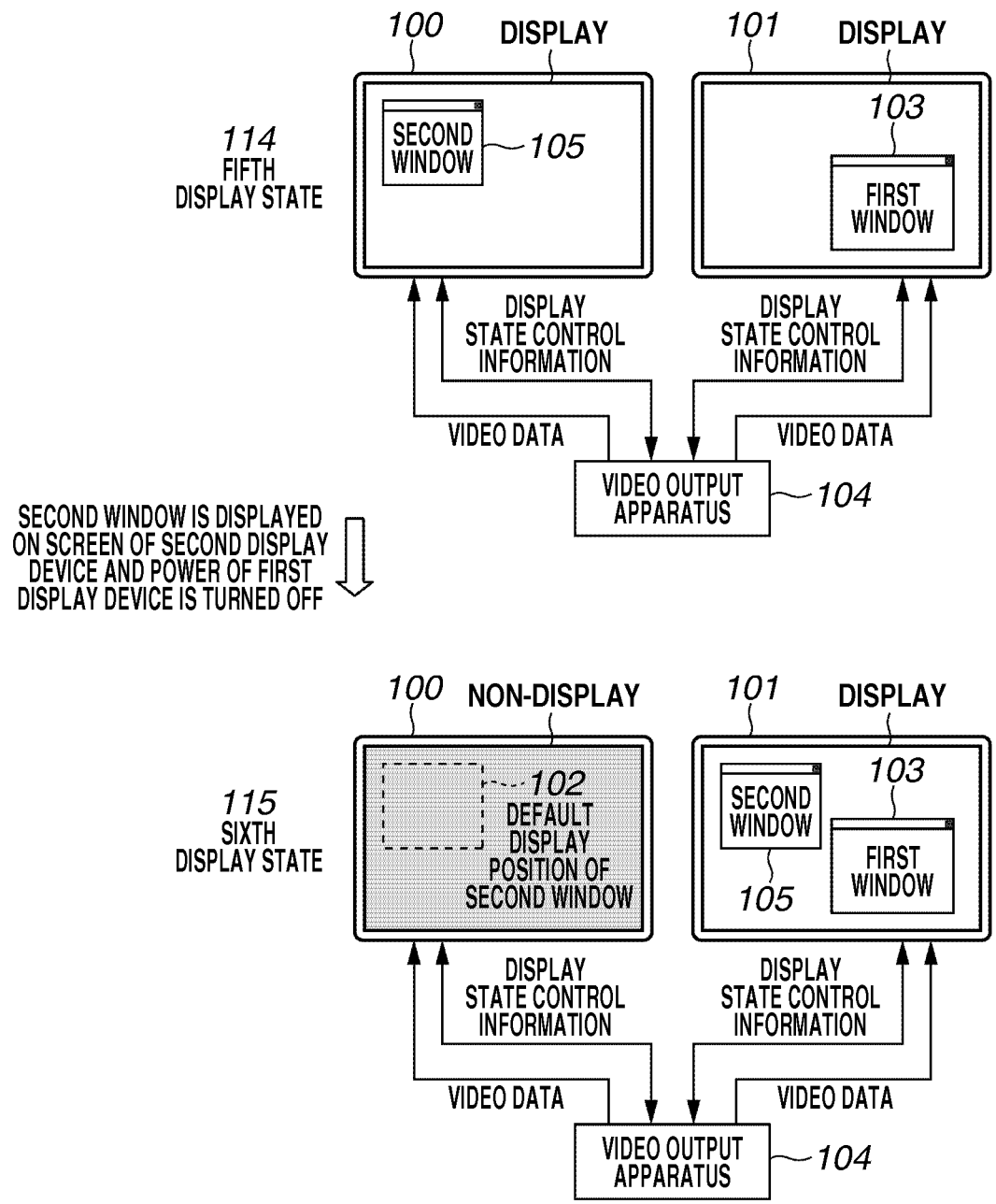
FIG. 2 illustrates an example of a screen transition of a multi display.

FIG. 2 illustrates an example of a screen transition of the multi display of a second use case according to the present exemplary embodiment. In a fifth display state 114, each of the screens of the first display device 100 and the second display device 101 is in the normal state and displays one window. After the lapse of a certain period of time, in a sixth display state 115, the second window 105 is rearranged on the screen of the second display device 101 and the first display device 100 enters into the power saving state. As is the first use case, the power consumption can be reduced while all the windows can be viewed by the user in the second use case.

Figure 3:
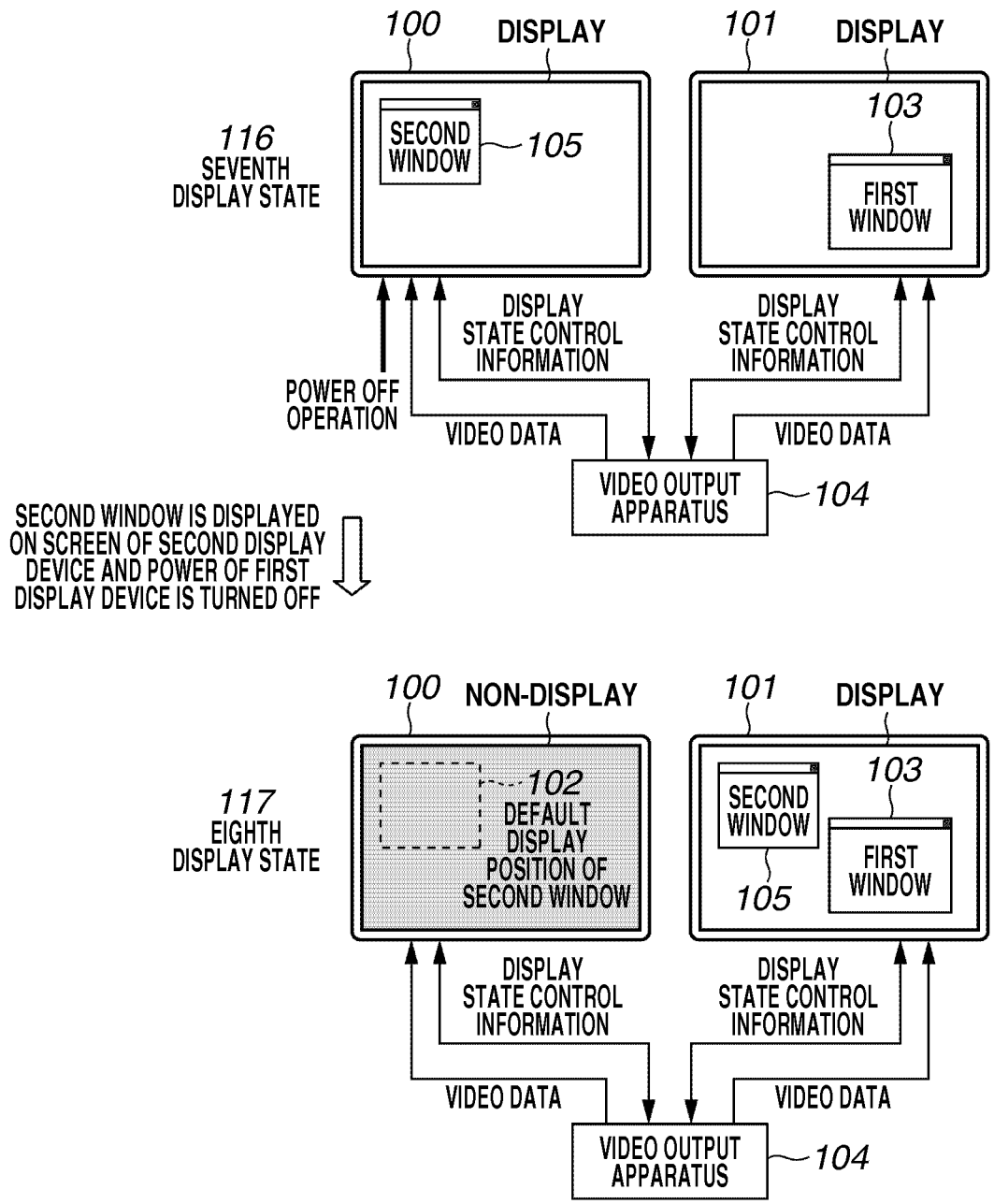
FIG. 3 illustrates an example of a screen transition of a multi display.

FIG. 3 illustrates an example of a screen transition of the multi display of a third use case according to the present exemplary embodiment. In a seventh display state 116, each of the first display device 100 and the second display device 101 is in the normal state and displays one window.

In an eighth display state 117, the first display device 100 is changed into the power saving state according to the operation of the user. The first display device 100 is changed to the power saving state and the second window 105 is rearranged on the screen of the second display device 101. As is the first use case, all the windows can be viewed by the user and the power consumption can be reduced in the third use case.

Figure 4:
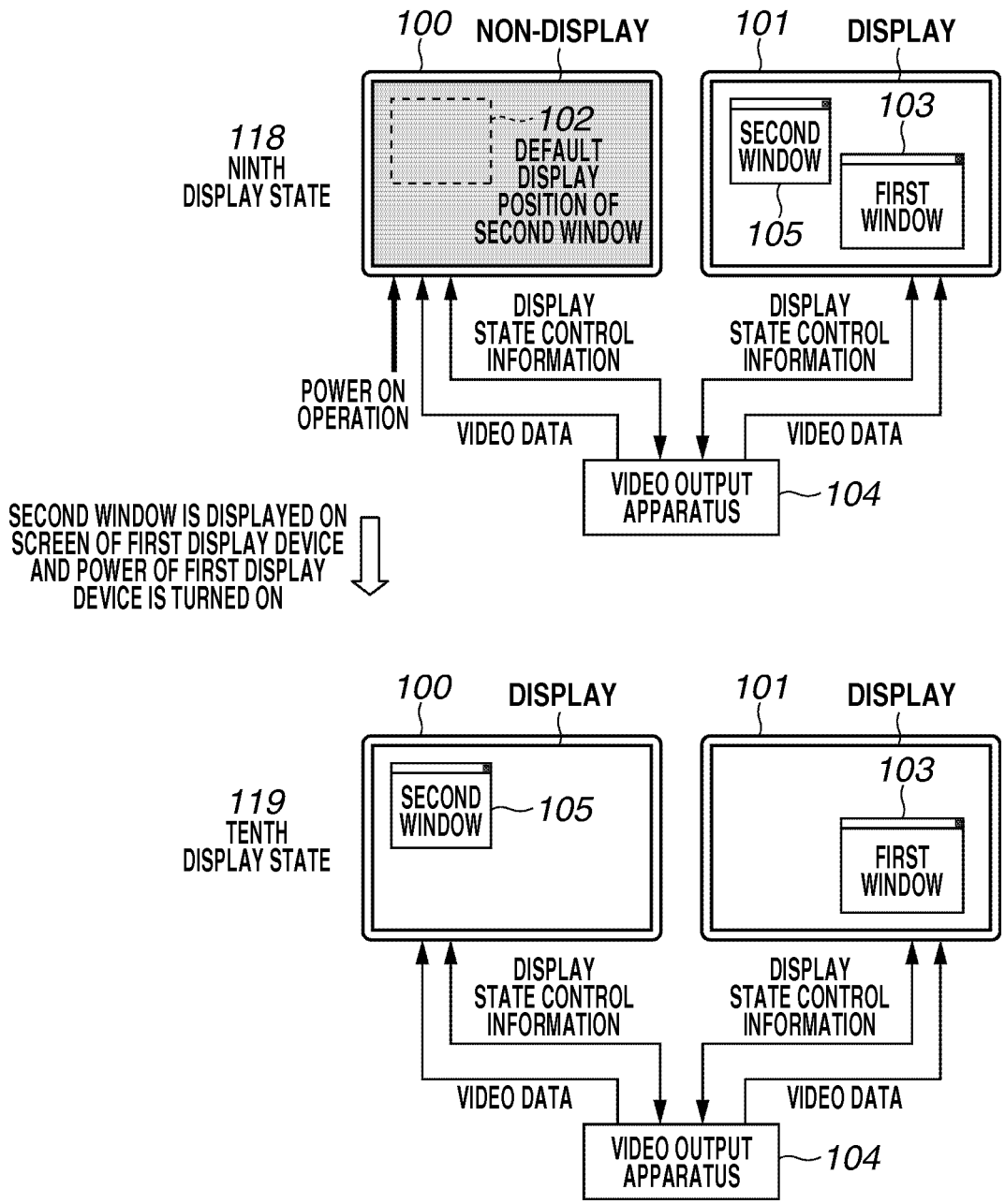
FIG. 4 illustrates an example of a screen transition of a multi display.

FIG. 4 illustrates an example of a screen transition of the multi display of a fourth use case according to the present exemplary embodiment. In a ninth display state 118, the first display device 100 is in the power saving state and the second display device 101 is in the normal state. Further, the first window 103 and the second window 105 are displayed on the screen of the second display device 101.

In a tenth display state 119, on the contrary, the state of the first display device 100 is expressly returned to the normal state according to the operation by the user. At this time, the first display device 100 is shifted to the normal state and the second window 105 which has been arranged on the screen of the second display device 101 is rearranged on the screen of the first display device 100 at the default position. In the fourth use case, if the power saving state is expressly changed to the normal state by the user, the arrangement of the window is returned to the original position. In this manner, it will be easier for the user to understand the position of the window.

As described above, by each of the above described unit operating in association with each other, output of the display state control information 520 and the video data to the plurality of display devices connected to the video output apparatus 500 can be controlled. As a result, the windows can be displayed on certain display devices and the rest of the display devices can be set in the power saving state. Accordingly, power consumption can be reduced.

According to the present exemplary embodiment, all the windows to be displayed are arranged on the display device in the normal state. However, only a part of the windows necessary for the user may be arranged on the screen of the display device in the power saving state, and the rest of the windows may be arranged on the screen of the display device in the normal state. Further, the rearrangement maybe performed at not only when the window is added/deleted but also when a certain period of time has passed. Further, the present invention is not limited to a multi display system, and can be applied to a display device which includes a plurality of sections whose power consumption can be reduced.

The present invention can be applied to a part of a system including a plurality of apparatuses or to a part of a system including one apparatus.

Further, the present invention is not limited to the apparatus and method to realize the above described exemplary embodiment, and different apparatuses and methods may be adopted. For example, an apparatus or a method for supplying a software program code configured to provide the functions of the exemplary embodiment to a computer (a central processing unit (CPU) or a micro processing unit (MPU)) in the above described system or apparatus is included in the scope of as the present invention. Further, the computer of the system or the apparatus operating the above described various devices according to the program code to realize the exemplary embodiment is also included in the scope of the present invention.

In this case, the software program code itself realizes the functions of the aforementioned exemplary embodiment. Further, the program code itself and a unit for providing the program code to a computer, in particular a computer readable storage medium storing the program code for causing the computer to execute the code also constitute the exemplary embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-132354 filed Jun. 1, 2009, which is hereby incorporated by reference herein in its entirety.

What is claimed is:

1. A data output apparatus comprising:
    a display state control unit configured to control a display state of at least one display device to change between a power saving state and a state which is not the power saving state;
    an acquisition unit configured to acquire information about display states indicating whether or not a display device is in the power saving state, from a plurality of display devices including a first display device and a second display device;
    an output unit configured to output data for displaying a window to the display devices;
    a control unit configured to, if first data for displaying a first window is to be output to the first display device by the output unit and the first display device is in the power saving state, control the output unit to output the first data to the second display device which is not in the power saving state, based on the information about the display state acquired by the acquisition unit; and
    a window arrangement unit configured to determine whether new display windows are added to any display device of the plurality of display devices based on the display state of each device,
    wherein if a new display window is added, and the display state of the first display device to display the new window is set to the power saving state, it is determined whether the new window can be rearranged on the second display device based on a setting of a flag indicating whether the state of the first display device can be changed by the data output apparatus; and
    wherein the information about display states is based on a user inputting information to set a validity flag.

2. The data output apparatus according to claim 1, wherein the control unit is configured to control, if the first data is to be output to the first display device and the first display device is in the power saving state, the output unit to output the first data to the second display device which is not in the power saving state such that the first window displayed on the second display device does not overlap with a second window already displayed on the second display device.

3. The data output apparatus according to claim 1, wherein the control unit is configured to control, if the first data is to be output to the first display device and the first display device is in the power saving state, the output unit to output first video data to the second display device which is not in the power saving state such that the first window displayed on the second display device does not overlap with a second window already displayed on the second display device by reducing a size of the second window displayed on the second display device.

4. The data output apparatus according to claim 1, wherein if the first data for displaying the first window is output to the first display device which is in the power saving state, the first window is not displayed by the first display device.

5. A method for outputting data comprising:
    controlling a display state of at least one display device to change between a power saving state and a state which is not the power saving state;
    acquiring information about display states indicating whether or not a display device is in the power saving state from a plurality of display devices including a first display device and a second display device;
    outputting data for displaying a window to the display devices;
    controlling processing of the data output such that, if first data for displaying a first window is to be output to the first display device and the first display device is in the power saving state, the first data is output to the second display device which is not in the power saving state, based on the acquired information; and
    determining whether new display windows are added to any display device of the plurality of display devices based on the display state of each device,
    wherein if a new display window is added, and the display state of the first display device to display the new window is set to the power saving state, it is determined whether the new window can be rearranged on the second display device based on a setting of a flag indicating whether the state of the first display device can be changed by the data output apparatus; and wherein the information about display states is based on a user inputting information to set a validity flag.

6. The method according to claim 5, wherein the method further includes controlling the processing of the data output so as to output, if the first data is to be output to the first display device and the first display device is in the power saving state, the first data to the second display device which is not in the power saving state such that the first window displayed on the second display device does not overlap with a second window already displayed on the second display device.

7. The method according to claim 5 further comprising, controlling the processing of the data output so as to output, if the first data is to be output to the first display device and the first display device is in the power saving state, the first data to the second display device which is not in the power saving state such that the first window displayed on the second display device does not overlap with a second window already displayed on the second display device by reducing a size of the second window displayed on the second display device.

8. The method according to claim 5, further comprising:
determining whether new display windows are added to any display device of the plurality of display devices based on the display state of each device,
wherein if a new display window is added, and the display state of the display device to display the new window is set to a power saving state, it is determined whether the new window can be rearranged on the display device based on a setting of a flag indicating whether the state of the display device can be changed by an external apparatus; and
wherein the information about display states is based on a user inputting information to set a validity flag.

9. A non-transitory computer-readable storage medium storing a computer-executable program configured to cause a computer to perform operations including:
controlling a display state of at least one display device to change between a power saving state and a state which is not the power saving state;
acquiring information about display states indicating whether or not a display device is in the power saving state from a plurality of display devices including a first display device and a second display device;
outputting data to the display devices; and
controlling processing of the data output such that, if first data for displaying a first window is to be output to the first display device and the first display device is in the power saving state, the first data is output to the second display device which is not in the power saving state, based on the acquired information; and
determining whether new display windows are added to any display device of the plurality of display devices based on the display state of each device,
wherein if a new display window is added, and the display state of the first display device to display the new window is set to the power saving state, it is determined whether the new window can be rearranged on the second display device based on a setting of a flag indicating whether the state of the first display device can be changed by the data output apparatus; and
wherein the information about display states is based on a user inputting information to set a validity flag.

10. The non-transitory computer-readable storage medium according to claim 9 further including:
determining whether new display windows are added to any display device of the plurality of display devices based on the display state of each device,
wherein if a new display window is added, and the display state of the display device to display the new window is set to a power saving state, it is determined whether the new window can be rearranged on the display device based on a setting of a flag indicating whether the state of the display device can be changed by an external apparatus; and
wherein the information about display states is based on a user inputting information to set a validity flag.

* * * * *